(12) United States Patent
Brinkmann et al.

(10) Patent No.: US 11,102,301 B2
(45) Date of Patent: Aug. 24, 2021

(54) PCA-BASED SCORING OF THE SIMILARITY OF DAMAGE PATTERNS OF OPERATIONAL ASSETS

(71) Applicant: SAP SE, Walldorf (DE)

(72) Inventors: Lukas Brinkmann, Walldorf (DE); Janick Frasch, Walldorf (DE); Robert Meusel, Walldorf (DE); Jan Patrick Klein, Walldorf (DE); Axel Kuhle, Walldorf (DE)

(73) Assignee: SAP SE, Walldorf (DE)

( * ) Notice: Subject to any disclaimer, the term of this patent is extended or adjusted under 35 U.S.C. 154(b) by 478 days.

(21) Appl. No.: 16/034,261

(22) Filed: Jul. 12, 2018

(65) Prior Publication Data
US 2020/0021657 A1   Jan. 16, 2020

(51) Int. Cl.
| | | |
|---|---|---|
| *G06K 9/62* | (2006.01) | |
| *G06T 3/60* | (2006.01) | |
| *H04L 29/08* | (2006.01) | |
| *G01D 5/00* | (2006.01) | |
| *G07C 5/00* | (2006.01) | |
| *G06F 16/2457* | (2019.01) | |
| *G06K 9/46* | (2006.01) | |

(52) U.S. Cl.
CPC .............. *H04L 67/12* (2013.01); *G01D 5/00* (2013.01); *G06F 16/24575* (2019.01); *G06F 16/24578* (2019.01); *G06K 9/6215* (2013.01); *G06K 9/6232* (2013.01); *G06T 3/60* (2013.01); *G07C 5/008* (2013.01); *G06K 9/469* (2013.01)

(58) Field of Classification Search
CPC ................ G01D 5/00; G06F 16/24575; G06F 16/24578; G06K 9/469; G06K 9/6215; G06K 9/6232; H04L 67/12; G07C 5/008; G06T 3/60
See application file for complete search history.

(56) References Cited

U.S. PATENT DOCUMENTS

| | | | |
|---|---|---|---|
| 8,117,061 B2 | 2/2012 | May et al. | |
| 8,401,819 B2 | 3/2013 | Kavaklioglu | |
| 9,311,615 B2 | 4/2016 | Davenport et al. | |
| 2004/0181422 A1 | 9/2004 | Brand | |
| 2006/0053347 A1 | 3/2006 | Van Ingen | |
| 2008/0167842 A1* | 7/2008 | Cochran | G05B 23/0281 703/2 |
| 2008/0294374 A1 | 11/2008 | Guralnik et al. | |

(Continued)

FOREIGN PATENT DOCUMENTS

CN       105334841 A      2/2016

*Primary Examiner* — Catherine T. Rastovski
(74) *Attorney, Agent, or Firm* — Mintz Levin Cohn Ferris Glovsky and Popeo, P.C.

(57) ABSTRACT

In some implementations, there is provided a method, which includes transforming, by the recommendation system, a first data set into the principal component analysis domain; rotating, by the recommendation system, the transformed first data first data set into a common axis system; comparing, by the recommendation system, the rotated, transformed first data set to at least one of a plurality of reference data sets having been rotated into the common axis system; and identifying, by the recommendation system, at least one reference data set, the identifying based on the comparing. Related systems, methods, and articles of manufacture are also disclosed.

14 Claims, 7 Drawing Sheets

(56) References Cited

U.S. PATENT DOCUMENTS

| | | |
|---|---|---|
| 2012/0166879 A1 | 6/2012 | Watanabe |
| 2013/0117267 A1 | 5/2013 | Buryak |
| 2014/0096251 A1 | 4/2014 | Doctor |
| 2016/0004610 A1 | 1/2016 | Knight |
| 2016/0092808 A1 | 3/2016 | Cheng et al. |
| 2016/0133066 A1 | 5/2016 | Lavie |
| 2016/0321606 A1 | 11/2016 | Kapil et al. |
| 2017/0083822 A1 | 3/2017 | Adendorff et al. |
| 2017/0092021 A1 | 3/2017 | Nielsen et al. |
| 2017/0102978 A1 | 4/2017 | Pallath et al. |
| 2017/0169217 A1 | 6/2017 | Rahaman et al. |
| 2018/0268015 A1* | 9/2018 | Sugaberry .............. G06N 5/003 |
| 2019/0312897 A1 | 10/2019 | Wang |

* cited by examiner

PCA-BASED SCORING OF THE SIMILARITY OF DAMAGE PATTERNS OF OPERATIONAL ASSETS

TECHNICAL FIELD

The subject matter described herein relates generally to Internet of Things.

BACKGROUND

As the Internet of Things (IoT) evolves, increasing amounts of data will be generated to enable a variety of things. Although the data generation may be useful in some respects, it may present a bane to many given the immense volume of data IoT will surely lead to.

SUMMARY

In some implementations, there is provided a method, which includes transforming, by the recommendation system, a first data set into the principal component analysis domain; rotating, by the recommendation system, the transformed first data first data set into a common axis system; comparing, by the recommendation system, the rotated, transformed first data set to at least one of a plurality of reference data sets having been rotated into the common axis system; and identifying, by the recommendation system, at least one reference data set, the identifying based on the comparing.

In some variations, one or more features disclosed herein including the following features may optionally be included in any feasible combination. The recommendation system outputting at least one recommendation based on the identified at least one reference data set. The at least one reference data set may be mapped to the at least one recommendation for a failure of an object being monitored by a sensor. The at least one recommendation may include a score indicative of a condition of the object. A portion of the first data set may be measured by the sensor. The sensor may include an Internet of Things sensor including a wireless transceiver for transmitting at least the portion of the first data set to the recommendation system. The common axis system may include an axis system of the first data set prior to the transforming. The rotating may include rotating the transformed first data first data set by an angle in accordance with the axis system of the first data set prior to the transforming. The recommendation system may receive the first data set representing sensor data measuring at least one aspect of an object. The method may further include receiving at least one data value measured by a sensor monitoring an object; and transforming the at least one data value into the principal component analysis domain of the first data set; rotating the transformed at least one data value into the common axis system; comparing the rotated, transformed at least one data value to the plurality of reference data sets; and identifying, based on the comparing, the at least one reference data set mapped to at least one recommendation to remedy a failure of the object being monitored by the sensor.

Implementations of the current subject matter may include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which may include a non-transitory computer-readable or machine-readable storage medium, may include, encode, store, or the like one or more programs that cause one or more processors to perform one or more of the operations described herein. Computer implemented methods consistent with one or more implementations of the current subject matter may be implemented by one or more data processors residing in a single computing system or multiple computing systems. Such multiple computing systems may be connected and may exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to web application user interfaces, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principals associated with the disclosed implementations. In the drawings.

When practical, similar reference numbers denote similar structures, features, or elements.

DETAILED DESCRIPTION

A system may provide a recommendation for a possible fix, replacement, or maintenance procedure. In the case of operational maintenance, the solution recommendation system may detect an issue and provide a recommendation. As IoT evolves along with artificial intelligence, the volume of issues that need attention may be too burdensome for a solely human-based response. To provide machine-based solution recommendations, sensor data from a variety of sources, such as IoT-based sensors as well as other types of sensors, may be collected and analyzed to assess any similarity in the behavior of the data as well as whether any corresponding issues.

To illustrate by way of example, a solution recommendation systems (e.g., SAP Predictive Maintenance and Service On Premise Edition™, SAP Vehicle Insights™ (SAP VI), SAP Application Enablement™ (SAP AE), as well as other systems) may collect and analyze sensor data including IoT data to generate anomaly scores (which may be indicative of an issue, such as a maintenance issue, failure issue, and/or the like) for a given asset(s), such as a device (e.g., vehicle, part, pump, and/or the like) being monitored by the sensor(s).

Sensor data may be analyzed for issues (also referred to as anomalies) using, for example, principal component analysis (PCA). PCA enables detection of whether an anomaly is present in a given set of sensor data and the strength, or magnitude, of the anomaly. But PCA-based methods may not provide insight inferring the kind of anomaly present in the data. For example, a PCA-based approach may calculate, for a given set of sensor data, an anomaly score indicating the presence of an anomaly in the sensor data, but the PCA may not indicate how the asset (from which the sensor data is obtained) is behaving abnormally, when there is, for example, a high score indicative of the presence of the anomaly. Moreover, PCA may not allow comparison across different datasets, as each data set may have its own PCA axis system. As used herein, a data set may include one or more data values.

In some example embodiments, there is provided a PCA-based process for analyzing multivariate machine sensor data for the presence of an anomaly in sensor data, the magnitude of the anomaly, and/or the kind of anomaly exhibited in sensor data. In some example embodiments, data sets from sensors, such as IoT sensors, are rotated in the PCA-domain, so that the PCA axes coincide with the axes of the sensor data. This rotation may, in some example embodiments, enable a comparison of different data sets in the PCA-domain.

Figure 1A:
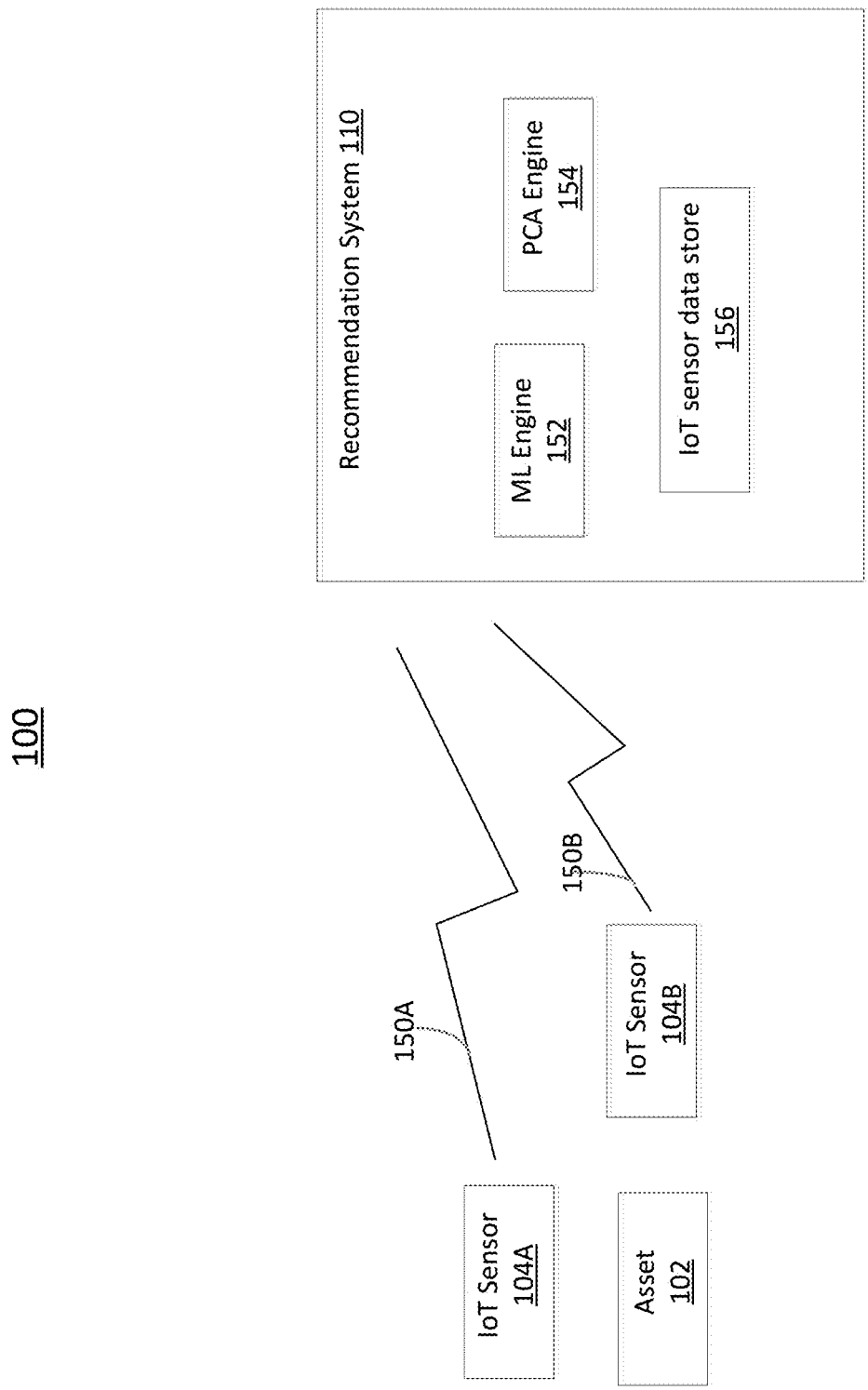
FIG. 1A depicts an example of a recommendation system.

FIG. 1A depicts an example system 100 including at least one asset 102. The asset may be any object, such as a device being manufactured, tested, and/or the like. For example, the asset may be at least a portion of a vehicle such as an engine at a factory. Alternatively or additionally, the asset may be a pump having one or more sensors, such as IoT sensors, measuring rotations per minute (RPM), pressure, and/or other values. Although the previous examples refer to specific types of assets, other types of assets may be used as well.

The system 100 may include at least one sensor, such as IoT sensors 104A-B, configured to collect, such as measure, monitor, and/or the like, one or more aspects of the at least one asset, such as asset 102. For example, a sensor may measure pressure, temperature, rotations per minute, and/or other values. The sensor may include at least one processor and at least one memory. The sensor may also include a network interface, which may be wired and/or wireless such as a Bluetooth, Bluetooth Low Energy, WiFi, or other types of wireless technology.

The sensors, such as IoT sensors 104A-B, may include connections 150A-B (e.g., wireless links, such as cellular, WiFi, Bluetooth, and/or the like, network connections, Internet connections, and/or the like) to a recommendation system 110. In some example embodiments, the links 150A-B may couple to a local device, such as a local server, router, gateway, smartphone, and/or the like, which further couples to the recommendation system 110 (which may be located on premise with the IoT sensors and/or assets and/or may be located remotely, such as at a cloud server or other remote server).

In the example of FIG. 1A, the recommendation system 110 may include a machine learning engine 152 and a PCA engine 154. To illustrate, a company may include IoT sensors to monitor a manufacturing process, for example. The sensor data collected by the IoT sensors may be forwarded to the recommendation system 110 for storage and processing to identify the presence of an anomaly in sensor data, the magnitude of the anomaly, and/or the kind of anomaly exhibited in sensor data, in accordance with some example embodiments.

To illustrate further by way of an example, the asset 102 may correspond to a pump. The IoT sensors 104A-B may monitor and/or measure the pump for pressure and rotations for minute (RPM). These measured values (or the pattern of the data values) may be indicative of an anomaly requiring maintenance. For example, the recommendation system 110 may be able to detect, from the sensor data, whether the pump needs maintenance based on an anomaly in the pressure and RPM sensor data collected over time. The detection of the anomaly may be performed using machine learning, such as using machine-learning engine 152, which may be a neural network or other form of machine learning that detects an anomaly in the data set. Alternatively or additionally, the detection of the anomaly may be in the PCA-domain, so the detection may be performed on data transformed using PCA.

The recommendation system 110 may detect, from PCA-based data (which has been transformed using PCA), the presence of the anomaly and/or the magnitude, such as a health score. In some example embodiments, the recommendation system 110 may compare the PCA data for a current sensor data set (which in this example is an anomaly in the pressure and RPM data set) to "reference" PCA sensor data for a past sensor data for which an anomaly was previous identified. For example, the reference PCA data may correspond to a data set in which the anomaly has previously been detected and maintenance was known/verified to be performed to correct the anomaly. To enable this comparison, the recommendation system may, in accordance with some example embodiments, rotate the data sets (e.g., both the "current" and "reference" data sets which are in the PCA domain) into a common domain (e.g., axis system or basis), such as the domain of the sensor (which in this example is the axis or coordinate system of pressure versus RPM). This rotation enables a comparison of the different PCA-based data sets for a given set of sensors.

Before providing additional description with respect to the recommendation system 110, the following provides description on PCA.

PCA-based processing for anomaly detection may assume multivariate sensor data records in a sensor coordinate system. The sensor coordinate system may refer to a coordinate system in which each coordinate axis represents the values of a specific sensor (e.g., $x_1$-axis is pressure of a specific valve, $x_2$-axis is revolutions per minute, etc.) at a specific point in time. Each data record may represent the state of the asset being measured by the sensor at a certain point in time.

Although some of the examples described herein refer to data measured by a sensor. The data may take other forms as well. For example, the data may be derived from measurements made from the sensors. Alternatively or additionally, the data may be combined or otherwise formed from a combination of sensor data and other types of data. Alternatively or additionally, the data may be transformed data (e.g., a Fourier Transform, an average of data points, and/or other type of function/transform).

For a set of k historical (or reference), n-dimensional sensor data records formed into the matrix $X \in \mathbb{R}^{n \times k}$, PCA may define a transformation from a first domain, such as a sensor coordinate system (e.g., pressure versus RPM), into a second domain, such an orthogonal coordinate system of so-called principal components (PCs) that are orthogonal directions of the maximum variance of the data X that are iteratively identified.

Figure 1B:
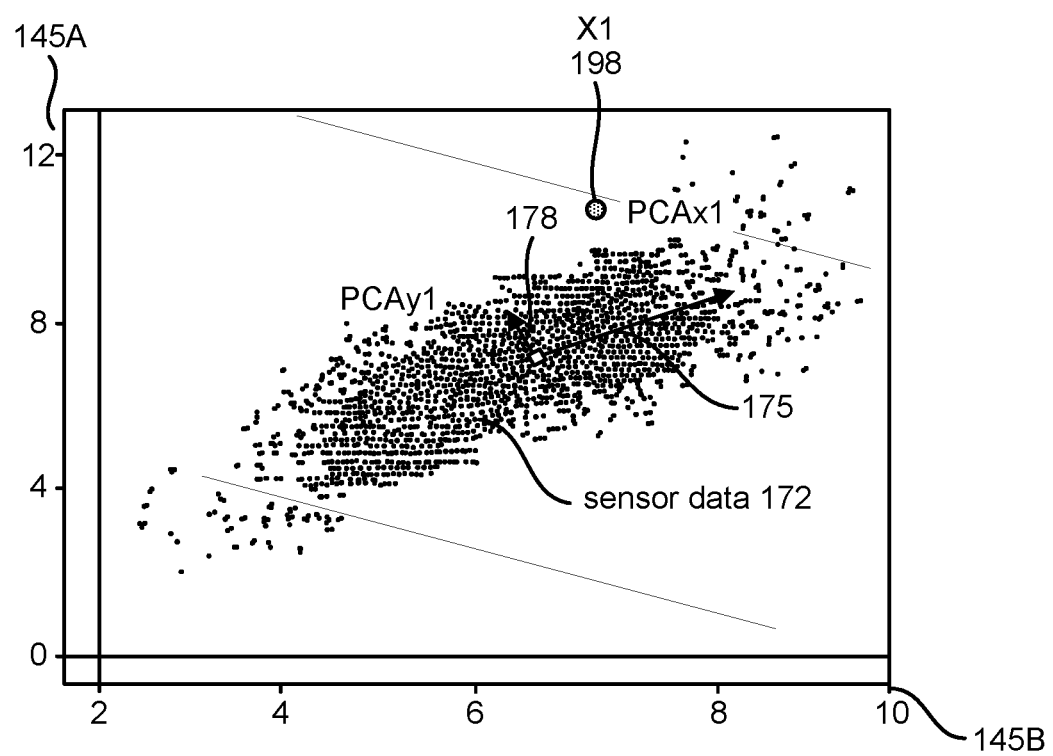
FIG. 1B-1D depict examples of data sets.
Figure 1C:
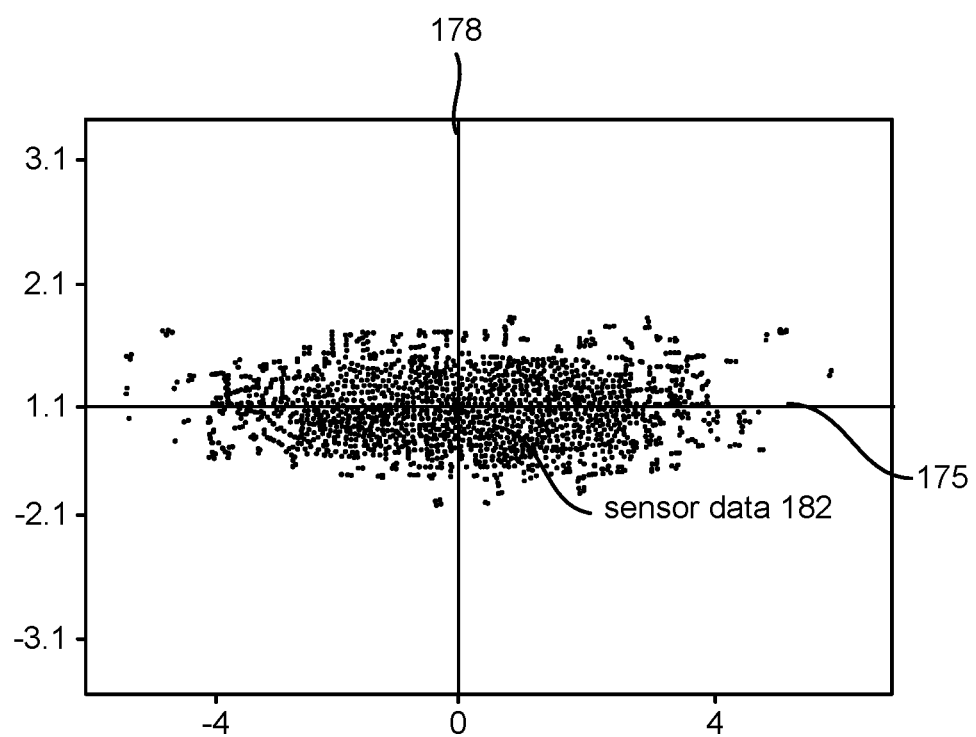

FIG. 1B depicts an example of sensor data 172 and the identified PCA axes 175 and 178. In the example of FIG. 1B, the coordinates 145A-B are in the sensor's coordinate system. Returning to the pressure and RPM example, the axis 145A may represent pressure, while axis 145B may represent RPM. Moreover, the first principal component is labeled PCAx1 175, while the second principal component is labeled PCAy1 178. FIG. 1B also depicts an anomaly x1 at 198. FIG. 1C depicts the sensor data 172 transformed into the PCA domain data 182 and the corresponding PCA coordinate system 175 and 178. As this example represents PCA processing, the axes are orthogonal.

An advantage of PCA is that it is a sound stochastic interpretation that enables the identification of anomalies in multivariate data sets. The PCA transformation of the sensor data may provide the following information with respect to the sensor data:

$\overline{X} \in \mathbb{R}^n$: centroid of sensor data records;

$\Lambda \in \mathbb{R}^{n \times n}$: diagonal matrix of data variances in direction of the sensor coordinate axes;

$\Lambda_{PC} \in \mathbb{R}^{n \times n}$: diagonal matrix of data variances in direction of the PCs; and $R \in \mathbb{R}^{n \times n}$: rotation matrix that maps the orientation of the PCA coordinate axes onto the Cartesian coordinate axes, such as the sensor coordinate system before transformation into the PCA domain.

PCA, as noted, may be used to analyze sensor data, such as IoT sensor data. For example, the recommendation system 110 may determine a PCA-based score, such as a health score indicative of a health of an asset and the corresponding prediction of whether maintenance is needed on the asset. To illustrate further, the recommendation system may determine, based on PCA, a magnitude such as a single health (e.g., condition) score over an interval of a sensor data as follows:

$$x = \begin{bmatrix} \text{Sensor 1} & \text{Sensor 2} & \ldots & \text{Sensor } n \\ x_1 & x_2 & \ldots & x_n \end{bmatrix} \in \mathbb{R}^n,$$

wherein each element (e.g., $x_1$, $x_2$, and so forth) represents a sensor value at an observation time (e.g., a time when the sensor measurement was made or collected). The interpretation of the calculated heath score, x, may correspond to a higher score being an indication that more anomalous behavior (e.g., unhealthy or poorer condition) is likely present at the asset, when compared to a lower score.

To perform a PCA transform of a given set of sensor data $x \in \mathbb{R}^n$, the sensor data may be shifted to an origin by correcting for the data, such as correcting for the centroid of the sensor data record. Next, the sensor data may be rescaled to a variance of 1 along each sensor coordinate (which may provide for increased robustness towards measurement scaling). The sensor data may then be rotated to align principal component axes with coordinate axes. For example, a matrix including the sensor data may be multiplied by a rotation matrix to rotate the sensor data in by a given angle. Next, the data is expressed relative to the variance along principal components by multiplying the values of the sensor data by $\Lambda_{PC}^{-1}$, which is the diagonal matrix of the reciprocal standard deviations in direction of the principal components. This may correspond to transforming a data record $x \in \mathbb{R}^n$ to a vector $x_{PC} \in \mathbb{R}^n$ in PCA coordinates by computing:

$$x_{PC} = \Lambda_{PC}^{-1} \cdot R \cdot \Lambda^{-1} \cdot (x - \overline{X}).$$

The PCA anomaly score of a record $x \in \mathbb{R}^n$ may then be defined as, for example, the distance, such as the squared distance, of x from the data centroid $\overline{X}$ of a given data set in the PCA coordinate system. This squared distance may be represented as follows:

$$s(x) := \|x_{PC}\|^2.$$

The health score, s(x), may, as noted, indicate whether the investigated asset shows any anomalous behavior, such as noted in the example above whether a pump needs maintenance and/or the like. This health score, s(x), does not, as noted, include information indicative of, for example, the type of anomaly, such as a damage pattern, such as the kind of anomaly present at the asset.

In practical applications, one may not assume that the same PCA is applicable across a larger range of assets (even if they are of a similar or even the same type series) and a longer period of time. Rather, one PCA needs to be performed for each group of assets that, for example, undergoes similar usage patterns and is of similar technical age (e.g., operating hours, etc.). And, the PCA may need to be recalculated periodically (e.g., every couple of weeks depending very much on the asset).

Comparing anomaly patterns in the PCA domain may present challenges due to the fact that the coordinate system in PCA is tied to the specific data set from which it is derived. Referring to FIG. 1B, the axis 175 is along the first principal component (which represents the largest degree of variance) of the data set, while axis 178 is along the second principal component (which represents the $2^{nd}$ largest degree of variance) of the data set. If a second data set were processed using PCA, the axis or coordinate system would likely be different (given the second data set has different statistical properties when compared to the first data set). For example, even for a given sensor and/or asset, the sensor data generate may change over time and have different statistical properties including variance. Thus, there is a challenge, as noted above, in comparing different PCAs from different data sets.

In some example embodiments, a data set is processed by rotating, such as rotation by a given angle (which may be in accordance with the rotation matrix noted above), the PCA coordinates (of a given data set) back to the original sensor coordinate axes. In this way, the PCA data sets collected over time for a given sensor may be compared in the same, common coordinate system associated with the sensor. Although the PCA is rotated to the original sensor axes system, the data may still be considered in some sense to be in the PCA domain since the axes (although rotated) still correspond to the principal components of the data. In other words, although the coordinates have been rotated, the data may not be strictly speaking in a PCA-domain but still be PCA-like. For example, the scaling of axes is not affected by the rotation, so the magnitude of variance in direction of the principal components (which may enable comparisons) is not unaltered.

To illustrate, sensors may monitor a pump and collect pressure as a function of rotations per minute, so in this example the sensor coordinate system is pressure versus RPM. In other words, the sensor data is in the pressure versus RPM domain. The sensors may collect this data repeatedly over time and converted, as noted, into the PCA domain. These data sets may not be compared in the PCA domain directly to detect an anomaly in the data set because, as noted, the PCA axis system will vary over time as the variance of each data set changes over time. However, rotation of the PCA data sets so that each is in the original sensor coordinate system may enable comparison among the data sets collected over time (e.g., to compare and detect anomalies).

Figure 1D:
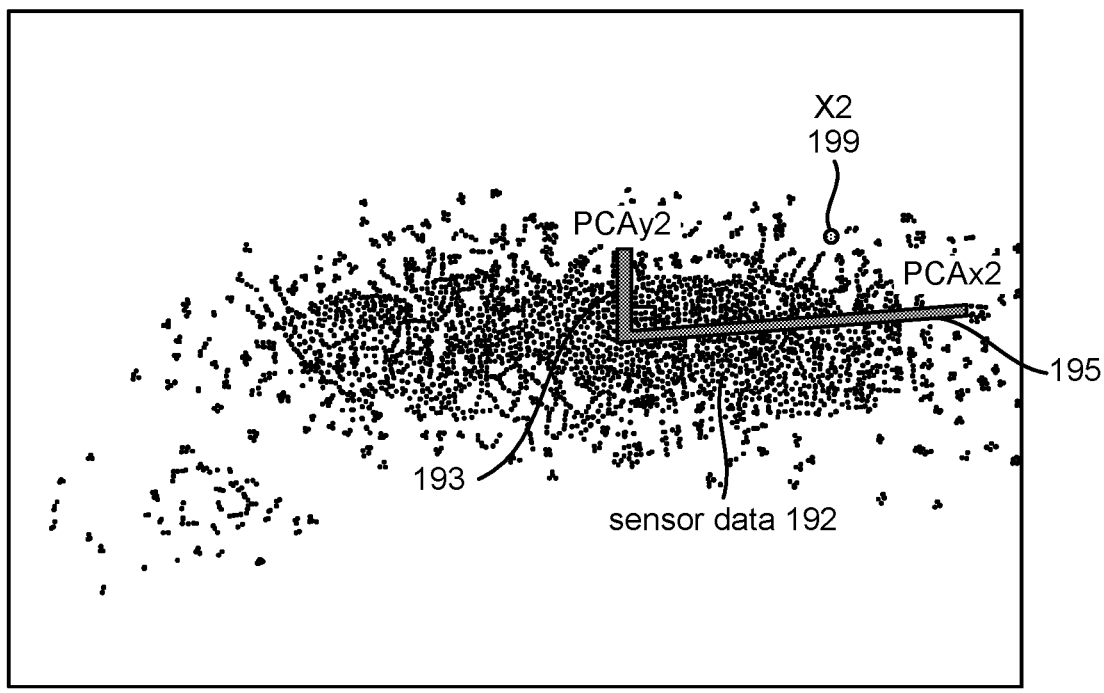

FIG. 1D depicts a second data set 192 collected at another time, when compared to data set 172 of FIG. 1B. The second data set 192 may be in the PCA domain, like data set 172. However, the variance of the data has changed over time so the PCA axes (which are orthogonal) for the two data sets may not be directly compared, so the anomaly x1 198 in the first data set 172 may not be compared to the anomaly x2 199 to determine whether they are the same or similar anomaly.

For example, the PCA-domain coordinates, PCAx1 175, PCAy1 178, of an anomaly $x_1$ in sensor data set 172 may represent an anomaly with the pump requiring maintenance. However, after 5000 hours of operation, the variance associated with the sensor data may change. Thus, the PCA-domain coordinates, PCAx2 195, PCAy2 193, of the same anomaly in sensor data set $x_2$ 199 may not be comparable in the PCA-domain without performing a rotation, in accordance with some example embodiments. Thus in accordance with some example embodiments, the data sets x1 and x2 are rotated into the coordinate system of the sensor data, such as pressure versus rotations per minute as noted in the previous example (or some other coordinate system corresponding to the measurements being made by the sensor). For example, the first data set 172 (FIG. 1B) may be rotated by 20 degrees so that it is consistent with the original sensor data coordinate system of FIG. 1C, while the second data set 195 may be rotated 5 degrees so that it is consistent with the original sensor data coordinate system.

To illustrate further, an anomaly pattern of $a \in \mathbb{R}^n$ may be expressed by its data set as follows:

$$a := R^T x_{PC}$$

in the sensor coordinate system. $R^{-1} = R^T$ holds due to R being an orthogonal matrix. The elements of the vector a correspond to the component-wise distance of the record to the normal condition in the directions of the sensor coordinate system relative the variance. The distances are comparable at different points in time as they are expressed with respect to the original directions. The distances in the individual directions of the sensor coordinate system may also be used as individual anomaly sub-scores. The entirety of the anomaly scores may specify the damage pattern of the asset under investigation by the recommendation system 110.

Having established the damage patterns in an absolute coordinate system (such as the PCA domain after applying rotation towards the original sensor coordinate system), the recommendation system may determine a similarity between two data sets/records (which may include an anomaly) with respect to the underlying damage patterns in terms of a similarity score. To this end, the anomaly patterns of two data records may be denoted as $x^{(1)}$ and $x^{(2)}$ by $a^{(1)} \in \mathbb{R}^n$ and $a^{(2)} \in \mathbb{R}^n$, respectively.

The distance $d(x^{(1)}, x^{(2)}) \in [0, \infty]$ between the two damage patterns may be expressed as a value, such as a Euclidean distance in the sensor coordinate system in accordance with the following:

$$d(x^{(1)}, x^{(2)}) = \|a^{(1)} - a^{(2)}\|^2$$

This is different from comparing $x^{(1)}$ and $x^{(1)}$ directly in the sensor coordinate system, since d specifies the distance between the two records $x^{(1)}$ and $x^{(2)}$ relative to the usual deviation and operational patterns visible in the sensor data.

Next, the recommendation system 110 may compute a similarity score between two data records by mapping the distance onto an interval, such as 0 to 1 (which in this example is normalized) such that a score of 1 corresponds to perfectly identical anomaly patterns and patterns are increasingly different as the score approaches 0:

$$s(x^{(1)}, x^{(2)}) = \frac{1}{d(x^{(1)}, x^{(2)}) + 1}.$$

The similarity score(s), $s(x^{(1)}, x^{(2)})$, may be output by the recommendation system 110, and the score(s) may specify the similarity between the two data sets representing so called damage (or anomaly) patterns $x^{(1)}$ and $x^{(2)}$. The higher the score, the more similar are the two damage patterns.

Figure 2:
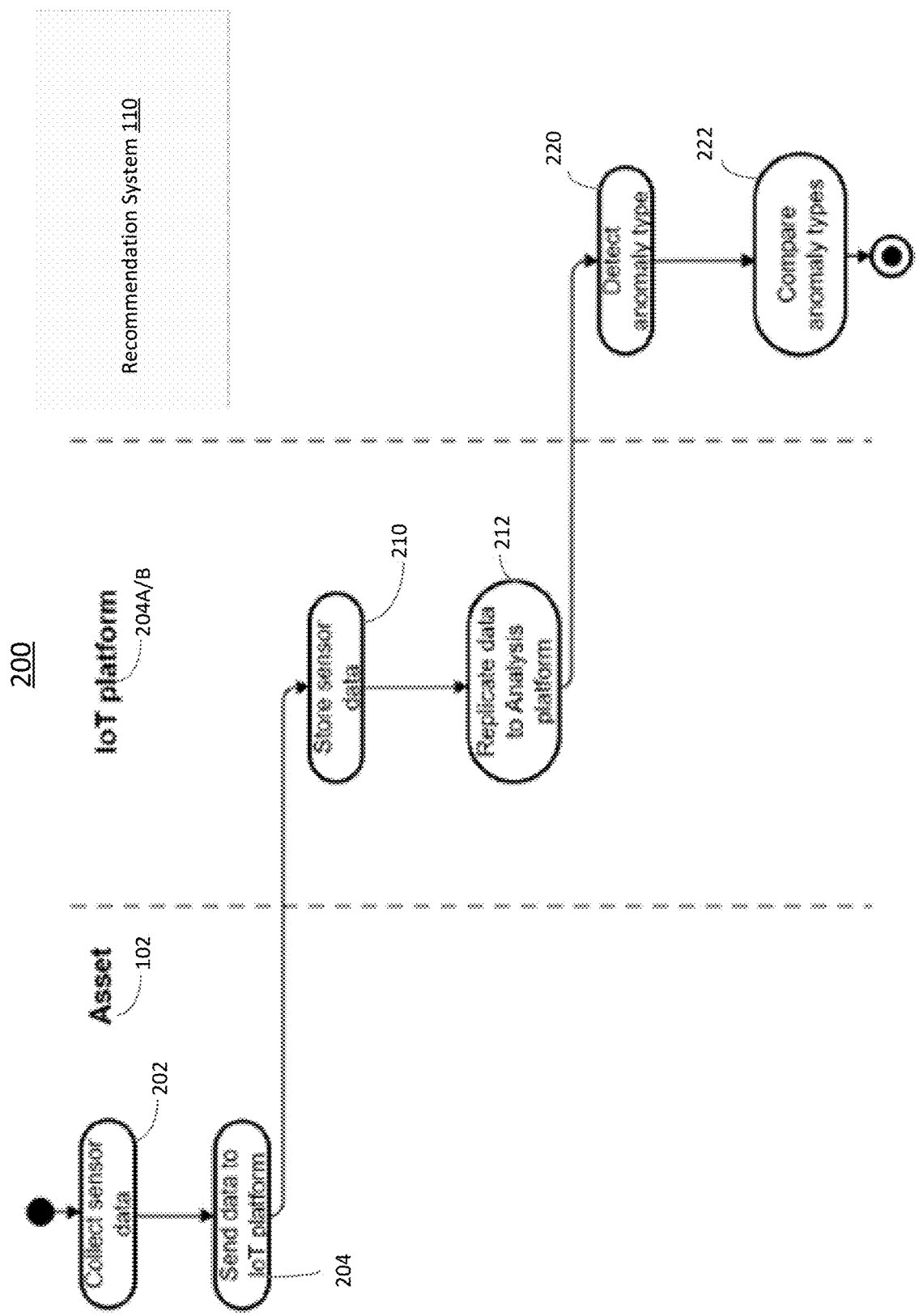
FIG. 2 depicts an example of a process for comparing data in the principal component analysis domain.

FIG. 2 depicts an example of a process 200 for processing sensor data, in accordance with some example embodiments.

In some example embodiments, the recommendation system 110 may collect sensor data from one or more IoT sensors 104A-B. The recommendation system 110 may determine health scores as noted above. Moreover, anomaly types in the sensor data may be detected. After the anomaly types are detected, a comparison between the detected anomaly types and previously identified anomalies is performed. In some example embodiments, this comparison is performed using PCA-domain data that has been rotated to the original axis/coordinate system associated with the sensor (e.g., the pressure versus RPM axis/coordinate system and/or the like).

At 202, a sensor, such as IoT sensor 104A, may collect, from an asset 102, sensor data. This sensor data may correspond to a measurement, observation, and/or the like. In some example embodiments, the IoT sensor 104A may perform the measurement on the asset 102. Alternatively or additionally, the asset may include sensors that may make measurements or collect information on the asset. In the example of FIG. 2, the asset, such as an object, may include a sensor that collects sensor data, at 202, and sends, at 204, the sensor data to an IoT sensor, such as IoT sensor 104A and/or 104B.

At 210, the IoT sensor, such as IoT sensor 104A and/or 104B, may store sensor data received from the asset 102. As noted, the IoT sensor may also perform its own measurements on the assets as well, in which case the sensor data may be stored along with other sensor data. Moreover, the IoT sensor 104A may collect the sensor data over time.

At 212, the IoT sensor, such as IoT sensor 104A and/or 104B, may copy the data for forwarding to the recommendation platform 110. For example, sensor data, such as pressure and RPM data for example, may be stored in data records from time to time. Moreover, the IoT sensor(s) may forward the sensor data via links 150A-B to the recommendation system 110.

At 220, the recommendation system 110 may process the sensor data and detect anomaly types by at least performing a rotation of the PCA based data to correspond to the coordinate (or axis system) of the original sensor data. For example, the recommendation system may transform the sensor data records into the PCA domain, as noted above. Once in the PCA domain, the recommendation system may rotate each of the data records so that the PCA axes correspond to the original sensor data axis system. As noted above with respect to FIGS. 1B and 1D, the PCA-domain coordinates, PCAx1 175, PCAy1 178, of an anomaly $x_1$ in sensor data set 172 may represent an anomaly with the pump requiring maintenance, while the PCA-domain coordinates, PCAx2 195, PCAy2 193, may not be comparable in the PCA-domain without performing a rotation, in accordance with some example embodiments. In this example, the PCA-based first data set 172 (FIG. 1B) may be rotated by 20 degrees so that it is consistent with the original sensor data coordinate system of FIG. 1C, while the PCA-based second data set 195 may be rotated 5 degrees so that it is consistent with the original sensor data coordinate system. The rotation of the PCA data sets may be performed using a rotation matrix which induces the desired amount of rotation in the data.

At 222, the recommendation sensor 110 may compare the anomaly types. For example, the recommendation sensor 110 may determine, based on the rotated PCA data, a similarity between the anomalies. To illustrate further, after the rotation into the axis system of the sensor, the recommendation sensor 110 may compare the pattern of the first data set 172 having a first anomaly, x1, to the pattern of the second data set 182 having a second anomaly, x2. If the patterns match (or the difference is within a threshold distance), the recommendation system 110 may determine that the recently measured data set, x2, has the same or similar anomaly as a reference data set, which in this example is data set x2. Returning to the pressure and RPM example, the recommendation sensor 110 may determine that the pump needs a certain type of maintenance.

Figure 3A:
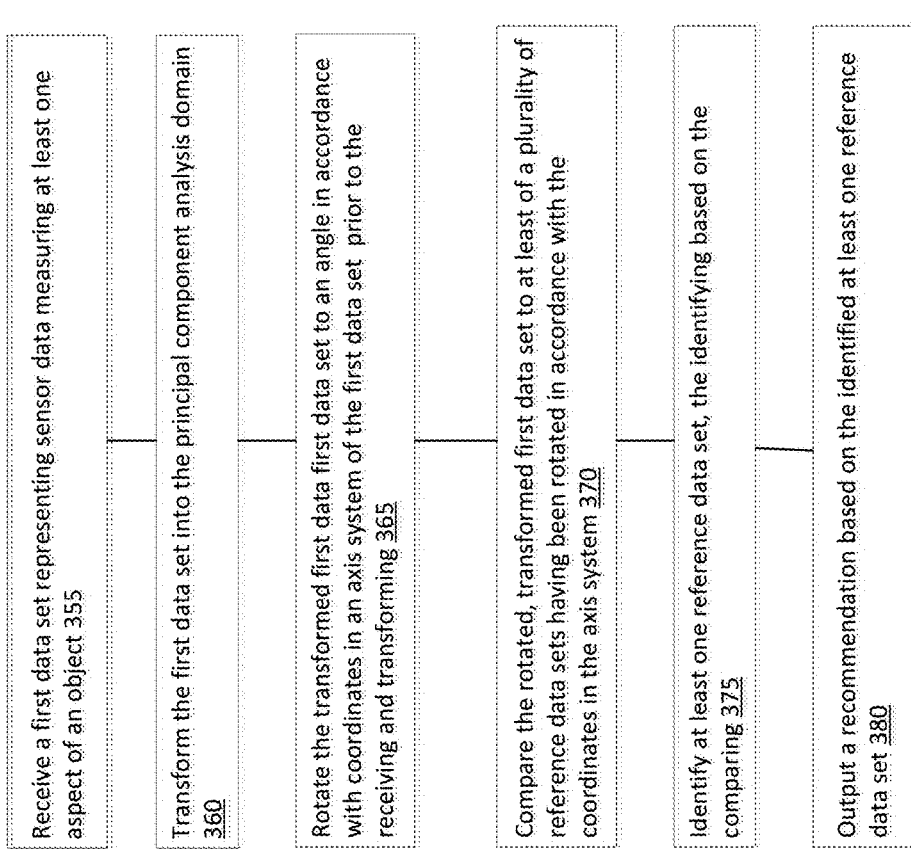
FIG. 3A depicts another example of a process for comparing data in the principal component analysis domain.

FIG. 3A depicts an example of a process 399, in accordance with some example embodiments. The description of process 399 also refers to FIG. 1A.

At 355, the recommendation system 110 may receive a first data set representing sensor data measuring at least one aspect of an object. For example, IoT sensors 104A-B may measure pressure and RPM of an asset 102, such as a pump. The IoT sensors 104A-B may forward sensor data in the form of data sets. Each of the data sets may represent pressure and RPM measurements for at a given time (or time period). FIG. 1B depicts an example of a data set in the pressure versus RPM coordinate or axis system of the original IoT sensors. The sensor data collected by the IoT sensors may be forwarded to the recommendation system 110 which receives the sensor data as a first data set representing sensor data measuring at least one aspect, such as pressure and RPM for example, of an object, such as asset 102.

At 360, the recommendation system 110 may transform the first data set into the principal component analysis (PCA) domain. For example, the first data set may be transformed into the PCA domain by performing a PCA transform.

At 365, the recommendation system 110 may rotate the transformed first data first data set to an angle in accordance with coordinates in an axis system of the first data set prior to the receiving at 355. For example, the recommendation system 110 may rotate the PCA transformed first data set. The rotation may be performed using a rotation matrix, which rotates the PCA data to align it with the coordinate system of the original sensor (which is the format before the data was received and then transformed). The rotation value may be based on the rotation matrix ($R \in \mathbb{R}^{n \times n}$) used to map the orientation of the PCA coordinate axes onto the Cartesian coordinate axes, such as the sensor coordinate system before transformation into the PCA domain. For example, the inverse (or negative value) of the angles used in the rotation matrix may be used at 365 to rotate the PCA based data to the sensor's original coordinate system.

At 370, the recommendation system 110 may compare the rotated, transformed first data set to at least of a plurality of reference data sets having been rotated in accordance with the coordinates in the axis system. For example, the pattern associated with the rotated, transformed first data may be compared to reference, data sets which have been similarly rotated and transformed into the PCA domain. The comparison may seek a match. For example, a match may be found if the data sets are the same or similar as measured by, for example, a similarity measure such as distance, Euclidean distance, distance between centroid patterns, and/or the like.

At 375, the recommendation system 110 may identify at least one reference data set, the identifying based on the comparing. For example, if the comparison identified a matching reference data set, then the first data set likely has the same anomaly as the matching reference data set. For example, if the first data set matches a reference data set indicating a certain type of pump maintenance, then the first data set likely needs the same kind of maintenance.

At 380, the recommendation system may output a recommendation based on the identified at least one reference data set. Returning to the previous pump example, if the first data set matches the reference data set indicating a certain type of pump maintenance, then the recommendation may output, as a message, text message, email, or other type of indication, that the first data set likely needs a certain kind of pump maintenance. This output may be sent to another processor based device, such as a computer, smartphone, tablet, and/or the like.

Figure 3B:
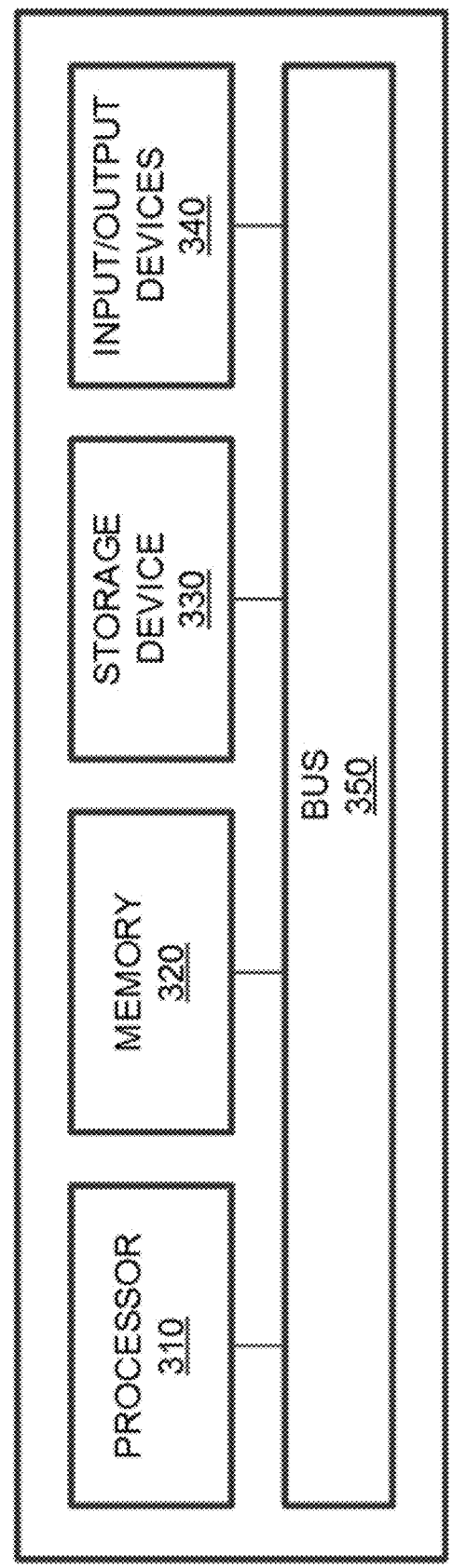
FIG. 3B depicts an example of a system.

FIG. 3B depicts a block diagram illustrating a computing system 300, in accordance with some example embodiments. Referring to FIGS. 1A-3A, the computing system 300 may be used to implement the recommendation system 110 and/or any components therein.

As shown in FIG. 3B, the computing system 300 may include a processor 310, a memory 320, a storage device 330, and input/output devices 340. The processor 310, the memory 320, the storage device 330, and the input/output devices 340 may be interconnected via a system bus 350. The processor 310 is capable of processing instructions for execution within the computing system 300. Such executed instructions may implement one or more components of, for example, recommendation system 110 including process 399 and/or the like. In some example embodiments, the processor 310 may be a single-threaded processor. Alternately, the processor 310 may be a multi-threaded processor. The processor 310 is capable of processing instructions stored in the memory 320 and/or on the storage device 330 to display graphical information for a user interface provided via the input/output device 340.

The memory 320 is a computer readable medium such as volatile or non-volatile that stores information within the computing system 300. The memory 320 may store data structures representing configuration object databases, for example. The storage device 330 is capable of providing persistent storage for the computing system 300. The storage device 330 may be a solid state drive, a floppy disk device, a hard disk device, an optical disk device, or a tape device, or other suitable persistent storage means. The input/output device 340 provides input/output operations for the computing system 300. In some example embodiments, the input/output device 340 includes a keyboard and/or pointing device. In various implementations, the input/output device 340 includes a display unit for displaying graphical user interfaces.

According to some example embodiments, the input/output device 340 may provide input/output operations for a network device. For example, the input/output device 340 may include Ethernet ports or other networking ports to communicate with one or more wired and/or wireless networks (e.g., a local area network (LAN), a wide area network (WAN), the Internet).

In some example embodiments, the computing system 300 may be used to execute various interactive computer software applications that may be used for organization, analysis and/or storage of data in various formats. Alternatively, the computing system 300 may be used to execute any type of software applications. These applications may be used to perform various functionalities, e.g., planning functionalities (e.g., generating, managing, editing of spreadsheet documents, word processing documents, and/or any other objects, etc.), computing functionalities, communications functionalities, etc. The applications may include various add-in functionalities or may be standalone computing products and/or functionalities. Upon activation within the applications, the functionalities may be used to generate the user interface provided via the input/output device 340. The user interface may be generated and presented to a user by the computing system 300 (e.g., on a computer screen monitor, etc.).

One or more aspects or features of the subject matter described herein may be realized in digital electronic circuitry, integrated circuitry, specially designed ASICs, field programmable gate arrays (FPGAs) computer hardware, firmware, software, and/or combinations thereof. These various aspects or features may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which may also be referred to as programs, software, software applications, applications, components, or code, include machine instructions for a programmable processor, and may be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example, as would a processor cache or other random query memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein may be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations may be provided in addition to those set forth herein. For example, the implementations described above may be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method comprising:
receiving, at a recommendation system, a first data set representing sensor data measuring at least one aspect of an object being monitored by a sensor;
transforming, by a recommendation system, the first data set into a principal component analysis domain;
rotating, by the recommendation system, the transformed first data set into a common axis system;
comparing, by the recommendation system, the rotated, transformed first data set to at least one of a plurality of reference data sets having been rotated into the common axis system;
identifying, by the recommendation system and based on the comparing, at least one reference data set, wherein the at least one reference data set is mapped to at least one recommendation for a failure of the object being monitored by the sensor; and
outputting, by the recommendation system and based on the identifying, the at least one recommendation.

2. A system comprising:
at least one processor and at least one memory including program code which when executed by the at least one processor causes operations comprising:
receiving a first data set representing sensor data measuring at least one aspect of an object being monitored by a sensor;
transforming the first data set into a principal component analysis domain;
rotating the transformed first data set into a common axis system;
comparing the rotated, transformed first data set to at least one of a plurality of reference data sets having been rotated into the common axis system;
identifying, based on the comparing, at least one reference data set, wherein the at least one reference data set is mapped to at least one recommendation for a failure of the object being monitored by the sensor; and
outputting, by the recommendation system and based on the identifying, the at least one recommendation.

3. The system of claim 2, wherein a portion of the first data set is measured by the sensor.

4. The method of claim 1, wherein the at least one recommendation includes a score indicative of a condition of the object.

5. The method of claim 1, wherein a portion of the first data set is measured by the sensor.

6. The method of claim 1, wherein the sensor comprises an Internet of Things sensor including a wireless transceiver for transmitting at least the portion of the first data set to the recommendation system.

7. The method of claim 1, wherein the common axis system comprises an axis system of the first data set prior to the transforming.

8. The method of claim 1, wherein the rotating comprises rotating the transformed first data set by an angle in accordance with an axis system of the first data set prior to the transforming.

9. The method of claim 1 further comprising:
receiving at least one data value measured by the sensor monitoring the object;
transforming the at least one data value into the principal component analysis domain of the first data set;
rotating the transformed at least one data value into the common axis system;
comparing the rotated, transformed at least one data value to the plurality of reference data sets; and
identifying, based on the comparing, the at least one reference data set that is mapped to at least one recommendation to remedy the failure of the object being monitored by the sensor.

10. The system of claim 2, wherein the at least one recommendation includes a score indicative of a condition of the object.

11. The system of claim 2, wherein the sensor comprises an Internet of Things sensor including a wireless transceiver for transmitting at least the portion of the first data set to the recommendation system.

12. The system of claim 2, wherein the common axis system comprises an axis system of the first data set prior to the transforming.

13. The system of claim 2, wherein the rotating comprises rotating the transformed first data set by an angle in accordance with an axis system of the first data set prior to the transforming.

14. A non-transitory computer-readable storage medium including program code which when executed caused operations comprising:
receiving a first data set representing sensor data measuring at least one aspect of an object being monitored by a sensor;
transforming the first data set into a principal component analysis domain;
rotating the transformed first data set into a common axis system;
comparing the rotated, transformed first data set to at least one of a plurality of reference data sets having been rotated into the common axis system;
identifying, based on the comparing, at least one reference data set, wherein the at least one reference data set is mapped to at least one recommendation for a failure of the object being monitored by the sensor; and
outputting, by the recommendation system and based on the identifying, the at least one recommendation.

* * * * *